United States Patent
Mann et al.

(10) Patent No.: US 7,938,429 B2
(45) Date of Patent: May 10, 2011

(54) FIFTH WHEEL COUPLING WITH INTER-FRAME MOUNT

(75) Inventors: Steven William Mann, Gardendale, AL (US); Gavin Charles Trinoskey, Birmingham, AL (US)

(73) Assignee: Fontaie Fifth Wheel Co., Trussville, AL (US)

( * ) Notice: Subject to any disclaimer, the term of this patent is extended or adjusted under 35 U.S.C. 154(b) by 177 days.

(21) Appl. No.: 12/466,297

(22) Filed: May 14, 2009

(65) Prior Publication Data

US 2011/0057416 A1    Mar. 10, 2011

(51) Int. Cl.
    *B62D 53/06*    (2006.01)
(52) U.S. Cl. .................. 280/438.1; 433/441; 433/495
(58) Field of Classification Search ............ 280/438.1, 280/433, 441, 407, 495, 656
    See application file for complete search history.

(56) References Cited

U.S. PATENT DOCUMENTS

| | | | | |
|---|---|---|---|---|
| 2,749,144 | A * | 6/1956 | Kayler | 280/438.1 |
| 3,584,899 | A | 6/1971 | Gottler et al. | |
| 5,265,900 | A * | 11/1993 | Stack et al. | 280/438.1 |
| 7,198,282 | B2 | 4/2007 | Burchett | |
| 2004/0145150 | A1* | 7/2004 | Yeakel | 280/433 |
| 2005/0082777 | A1 | 4/2005 | Burchett | |
| 2008/0042397 | A1* | 2/2008 | Warnock | 280/438.1 |
| 2009/0230655 | A1* | 9/2009 | Schmidt et al. | 280/407 |

FOREIGN PATENT DOCUMENTS

EP    0481928    4/1992

* cited by examiner

*Primary Examiner* — Joanne Silbermann
*Assistant Examiner* — Tashiana Adams
(74) *Attorney, Agent, or Firm* — George P. Kobler; Lanier Ford Shaver & Payne, PC

(57) ABSTRACT

An integrated cross-member mount comprises an inter-frame mount seated within opposing longitudinal channels of parallel adjacent truck frame members and comprises a top surface within each lateral portion of which is defined a longitudinally-oriented row of spaced-apart, shaped apertures, and at least two substantially vertical flanges extending downward from the lateral periphery of the top surface that are dimensioned to be conforming to the inner surfaces of truck frame members. Also included is a sliding pedestal having lateral skids seated upon respective portions of rows of spaced-apart apertures and extending into vertical gaps between the top surface of the mount and the truck frame member. Each skid includes a plurality of spaced-apart, shaped skid apertures that can align with a corresponding plurality of shaped apertures within the top surface of the mount. Each skid also includes a pawl pivotally mounted on each skid having a one or more teeth insertable through the skid apertures and the shaped apertures. The pedestal also includes a plurality of pivot bearings mating to a corresponding plurality of bearings of a fifth wheel hitch plate.

4 Claims, 6 Drawing Sheets

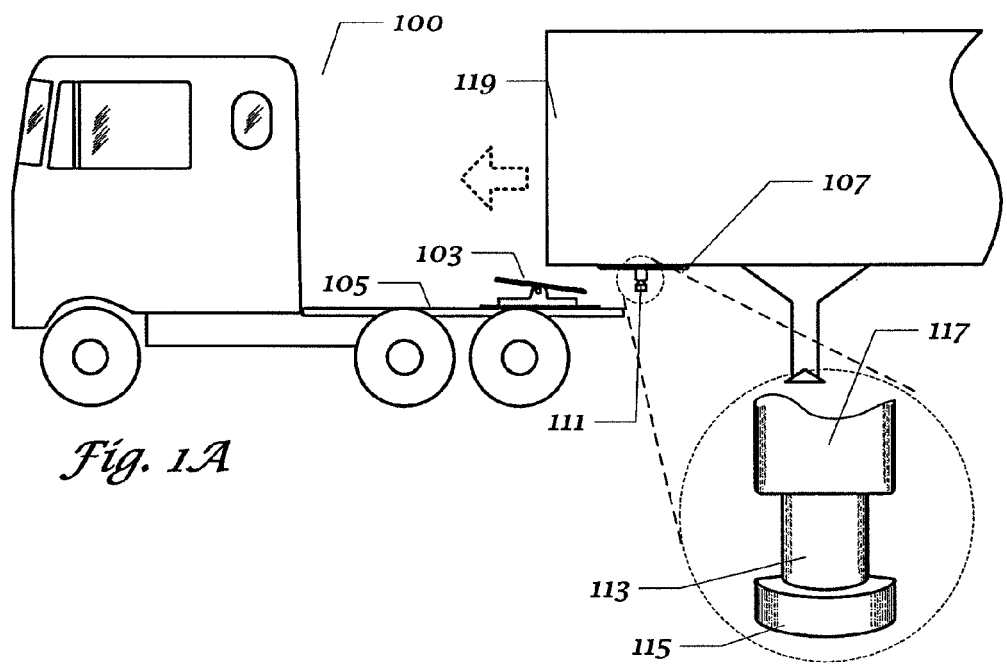
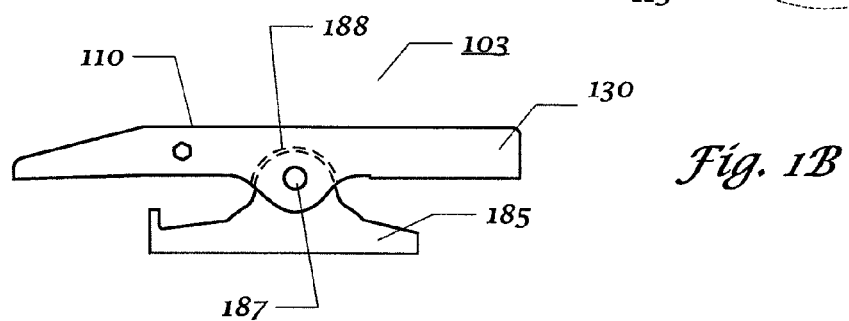
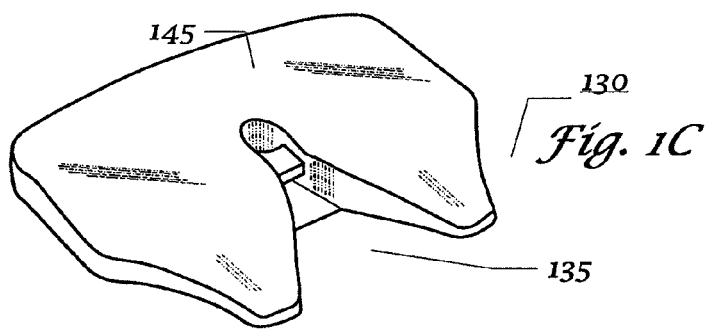
Fig. 1A
Fig. 1B
Fig. 1C

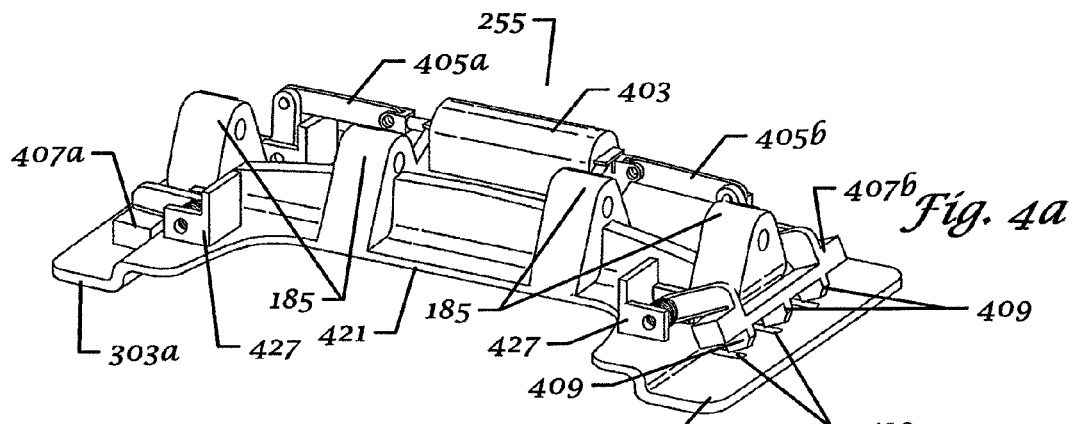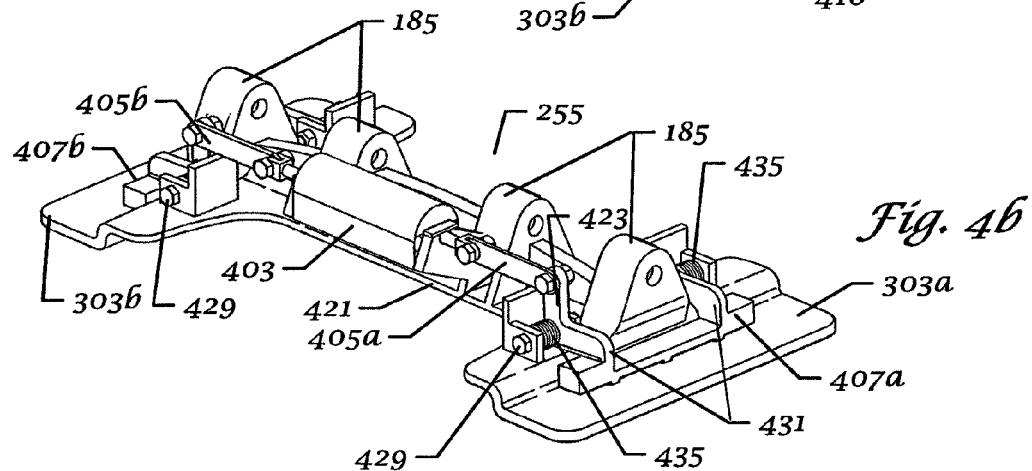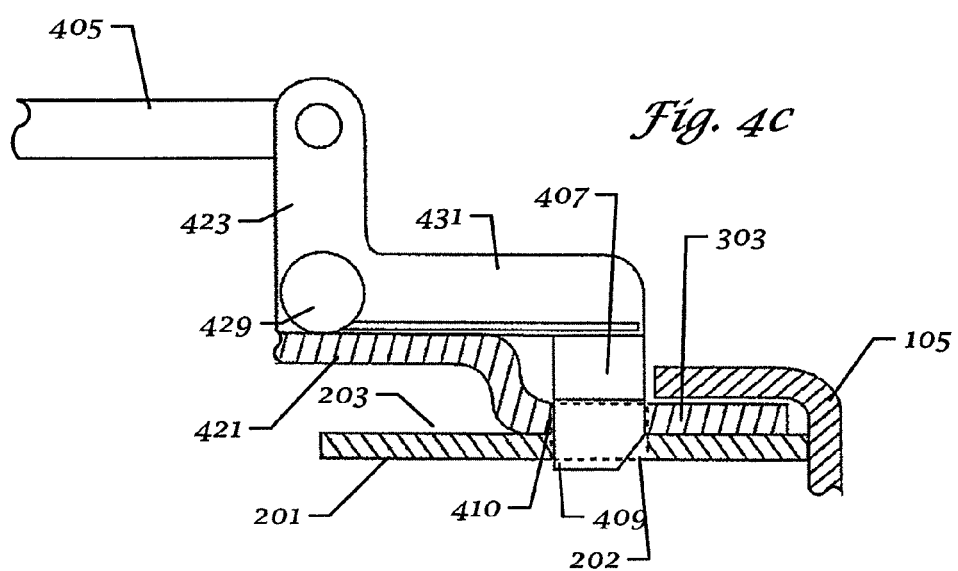

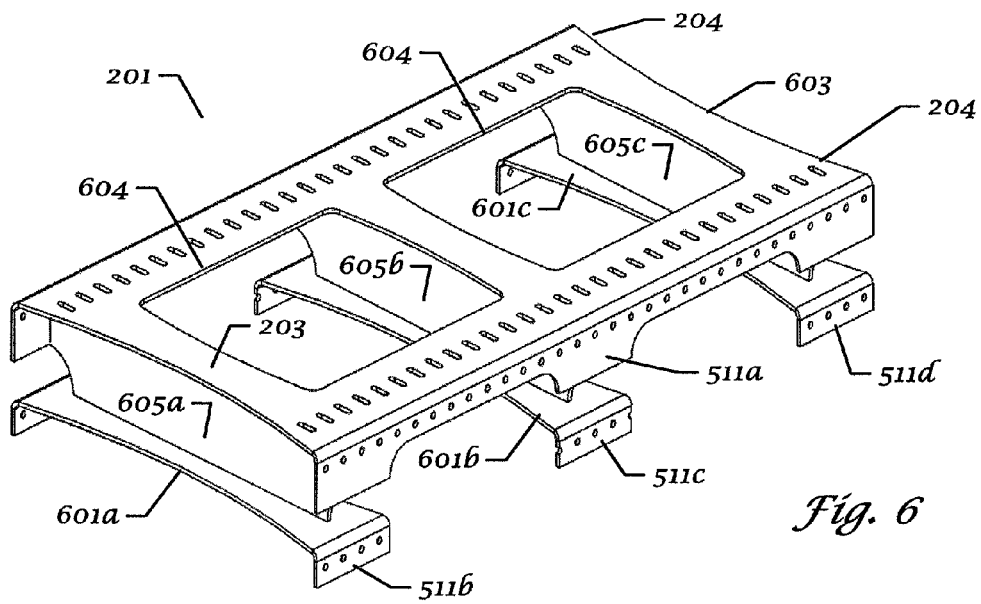
Fig. 6
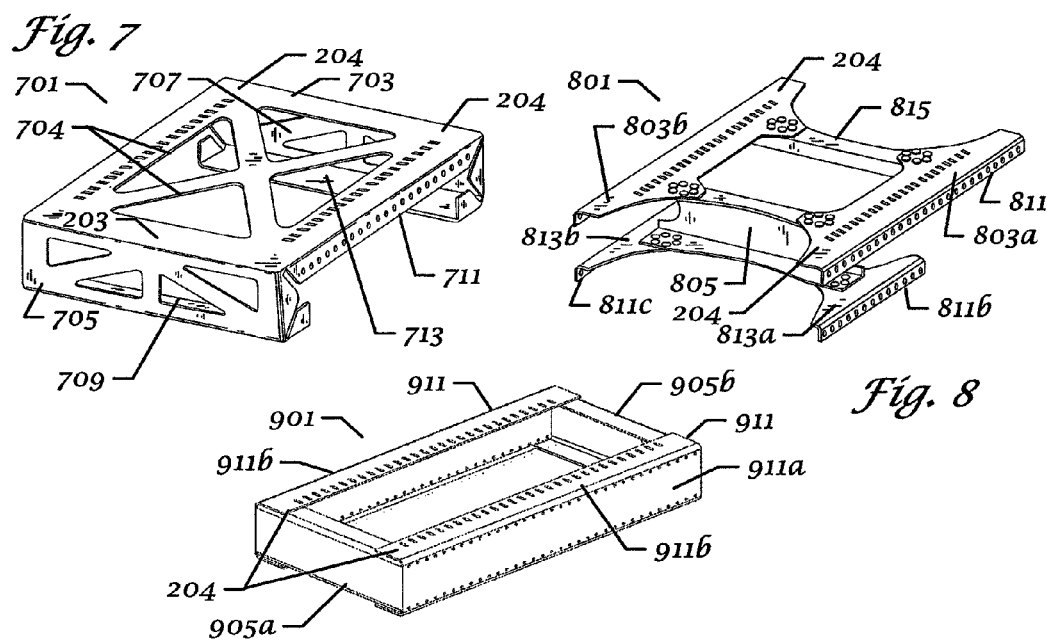
Fig. 7
Fig. 8
Fig. 9

FIFTH WHEEL COUPLING WITH INTER-FRAME MOUNT

BRIEF DESCRIPTION OF THE DRAWINGS

The present invention is described with reference to the accompanying drawings. In the drawings, identical reference numbers indicate identical or functionally similar elements. Additionally, the left-most digit(s) of a reference number identifies the drawing in which the reference number first appears.

FIG. 1A is an exemplary tractor truck and trailer with a fifth wheel hitch;

FIG. 1B is an exemplary fifth wheel hitch;

FIG. 1C is a hitch plate;

FIG. 4a-c respectively, are opposing perspective views of the exemplary sliding pedestal;

FIG. 6 is an illustration of an exemplary inter-frame mount;

FIG. 7 is an illustration of another exemplary inter-frame mount;

FIG. 8 is an illustration of another exemplary inter-frame mount; and

FIG. 9 is an illustration of another exemplary inter-frame mount.

DETAILED DESCRIPTION

Figure 1D:
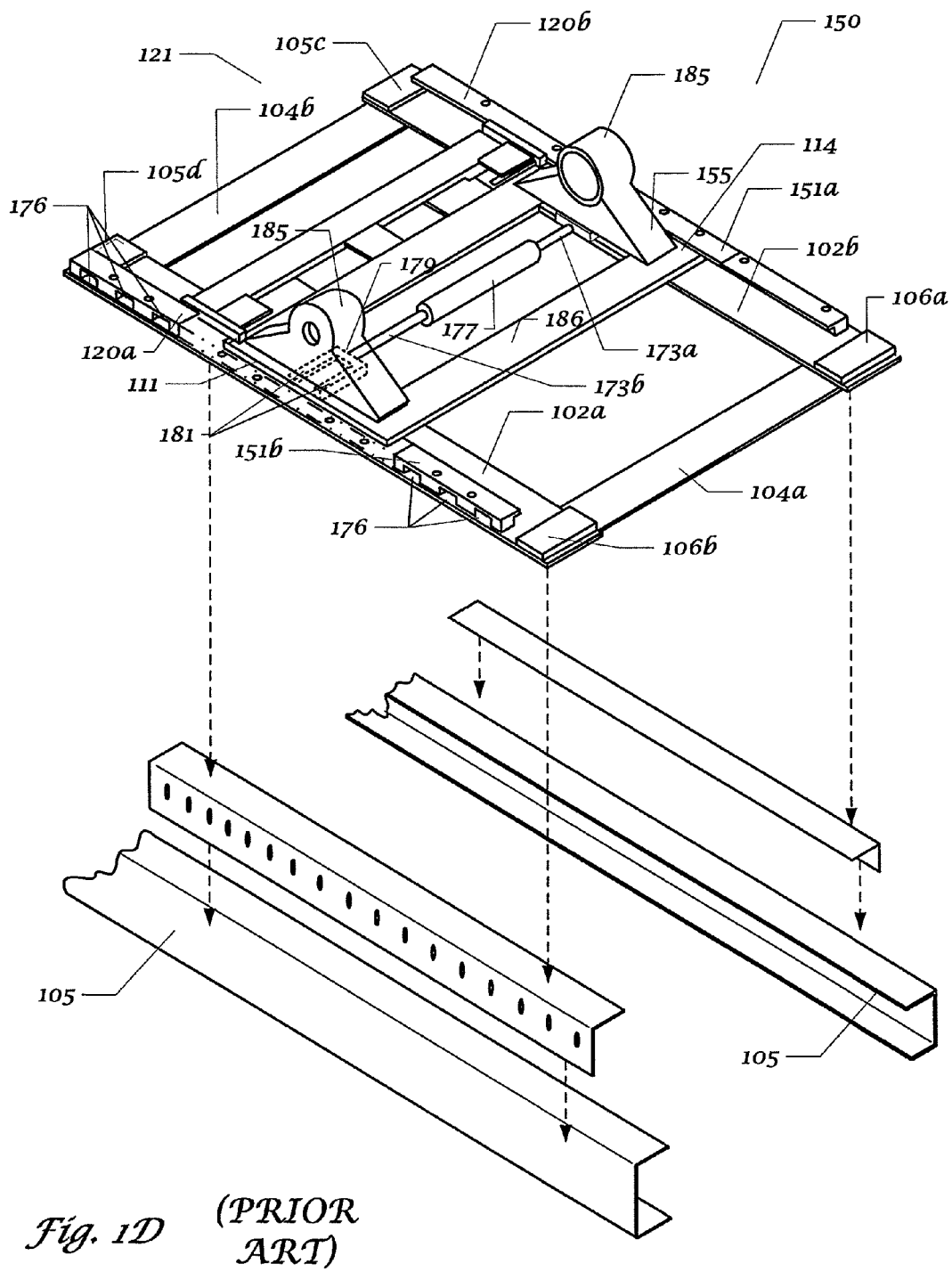
FIG. 1D is a prior art fifth wheel assembly with prior art slide rail assembly.

The various embodiments of the present invention and their advantages are best understood by referring to FIGS. 1 through 9 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," or "outward," or the like, and variants and derivatives thereof are to be understood in relation to the truck or vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on mounting brackets 185 by means of a mounting pin 187 inserted through corresponding bores through the hitch plate 130 and the bracket 185. The underside of the plate 130 includes a bearing 188 which rests upon the curved top of the bracket 185 Fifth wheel hitch assembly 110 comprises hitch plate 130 which houses a locking mechanism underneath (not shown) with slot 135 opening toward the aft end of fifth wheel assembly 110 for receiving a kingpin 111 from trailer 119.

Kingpin 111 typically extends from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

FIG. 1D depicts an example of the prior art fifth wheel mounting assembly 150 where slide rail assembly is comprised of left and right slide rail plates 102a, b tied in parallel by two or more tie bars 104a, b which form slide frame 121. Left slide rail 102a is attached to the upper surface of left slide rail plate 102a and right slide rail 151a is attached to upper surface of right slide rail plate 102b such that fifth wheel hitch assembly 110 and pedestal 155 are located therebetween, inboard of the left and right slide rails 102a, b. Slide rail plates 102a, b and slide rails 151a, b each have longitudinal axes which parallel the longitudinal axis of tractor 109. Slide stop blocks 106a-d are located at each end of each slide rail plate 102a, b. Slide stop blocks 106a-d prevent over travel of pedestal 155, which is comprised of two or more mounting brackets 185 mounted in parallel on a tie plate 186. As is shown in the illustration, slide rails 151a, b of the prior art are typically a flange extending inboard of the assembly, slidably receiving flanges 111, 114 of pedestal 155. Slide rails 151a, b typically include gaps, or detents, 176 spaced along the length of the slide rail. The slide rail assembly is secured to the top and out lateral side of c-shaped truck frame members 105a, b, typically with pieces of angle iron bolted to both the frame members 105a, b, to serve as attachment mounts for the slide assembly.

The pedestal 155 may include a means for selectively locking the pedestal in position longitudinally with respect to the slide rail assembly. One example, shown in FIG. 1D, is a pneumatic cylinder 177 mounted in the pedestal from which laterally extend plunger arms 173a, b. A fork member 179 may be mounted to the respective lateral ends of plunger arms 173, where the fork member includes projections, or prongs, 181 that insert into the slide rail gaps 176 when the plungers arms are extended. The engagement of the projections 181 into the gaps 176, thus, prevents longitudinal movement of the pedestal, and, therefore, the fifth wheel assembly.

Figure 2:
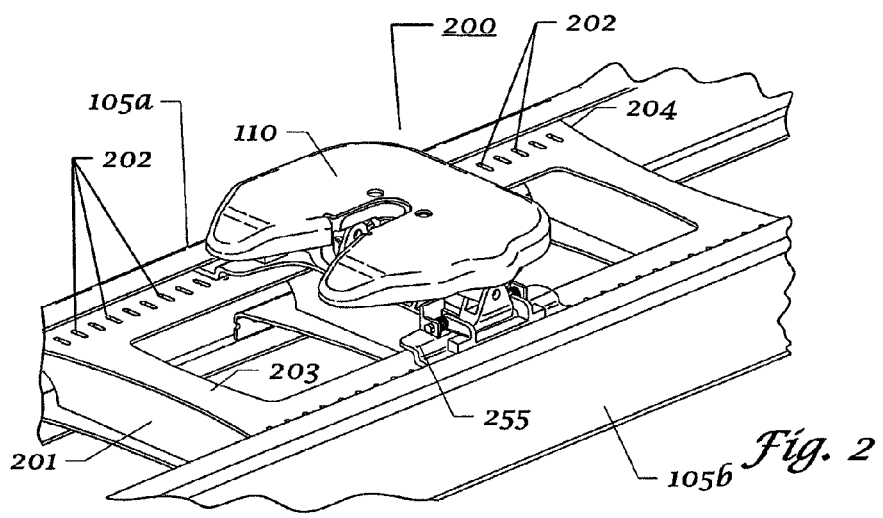
FIG. 2 illustrates an exemplary fifth wheel hitch with an inter-frame mount.
Figure 3:
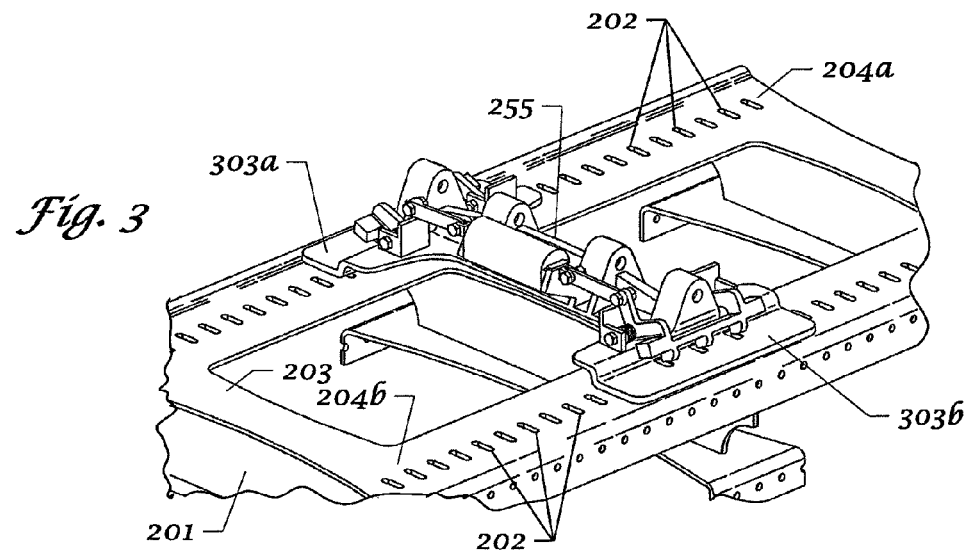
FIG. 3 depicts an exemplary sliding pedestal and inter-frame mount.

FIG. 2 illustrates a fifth wheel assembly 200 reflecting an embodiment of the present invention. A fifth wheel hitch assembly 110 is pivotally coupled to a sliding pedestal 255 which sits upon the top surface 203 of an inter-frame mount 201. The top surface 203 of the mount 201 includes longitudinally oriented rows 204a, b of spaced-apart, shaped apertures 202 defined therein, which, in this embodiment, are disposed toward either side of the top surface 203, where the apertures 202 are arrayed substantially parallel to the longitudinal axis of the vehicle. Inter-frame mount 201 is installed within the opposing longitudinal channels defined by the c-shaped truck frame members 105a, b. FIG. 3 shows the pedestal 255 and mount 201 without the truck frames of FIG. 2. Pedestal 255 includes two laterally spaced-apart skids 303a, b, that are slidably seated upon respective lateral sides of the top surface 203 over the respective rows 204a, b of shaped apertures 202. The skids 303a, b have axes that align with the respective rows 204a, b of shaped apertures 202.

FIGS. 4a, 4b and 4c show an exemplary sliding pedestal 255 having a pedestal base 421 spanning between the spaced-apart skids 303a, b. Base 421 provides support for a centrally-mounted actuator 403 configured to selectively laterally extend and retract transverse linkages 405a, b. A plurality of mounting brackets are disposed transversely across the pedestal base 421 each of which mates with a corresponding number of bearings (FIG. 1: 188) on the underside of a fifth wheel hitch plate 130 to allow plate 130 to pivot in the vertical, longitudinal plane while supported. Plate 130 is secured to the brackets by mounting pins.

Each skid 303a, b is formed with an array of a plurality of spaced-apart, shaped skid apertures 410 disposed along the skid axis. The skid apertures 410 are of the same shape as the shaped apertures in the top surface 203 of the mount, and correspond with an equal number of shaped apertures 202 when the pedestal 255 is moved into a desired longitudinal position relative to the vehicle. A pair of longitudinally oriented pawls 407a, b are pivotally mounted to the respective transverse ends of the pedestal base 421 such that pawls 407a, b, rotate in the vertical, transverse plane, and are actuated through mechanical coupling to the transverse linkages 405a, b by a stanchion 423. In this embodiment, the pedestal base 421 includes bearings 427 which support rotation of longitudinally disposed axles 429 providing with a longitudinal axis of rotation. Pawls 407 are rotationally coupled to the axles 429 and are formed with one or more arms 431 extending laterally from the axles 429. A plurality of teeth 409 extend from a bottom side of the pawls 407 a, b and are arranged in a row along the pawl 407. Teeth 409 line up vertically with skid apertures 410 such that when the pawls are rotated downward by outward movement of the linkages 405 from the actuator 403, teeth extend through the skid apertures 410. Bias members 435, which may be springs, or the like, may be used to bias the pawl 407 to the downward position. Thus, as shown in FIG. 4c, teeth 409 may be selectively inserted into skid apertures 410 and through shaped-apertures 202 when the respective sets of apertures 202, 410 correspond. In this manner, pedestal 255 is retained in longitudinal position. It will be appreciated that each tooth 409 is formed to have at least the portion of its parallel cross-section taken at the region along the tooth that is within the respective apertures 202, 410, when the tooth is inserted therein, to be the shape as that of the shaped apertures 202, and 410, only slightly smaller in area. FIG. 4c also shows the laterally outward portion of skid 303, while resting on the top surface 203 of the mount 201, is under the upper inwardly extending portion of the truck frame 105. In this way, the pedestal 255 is constrained vertically and is, therefore, retained on the truck.

Figure 5:
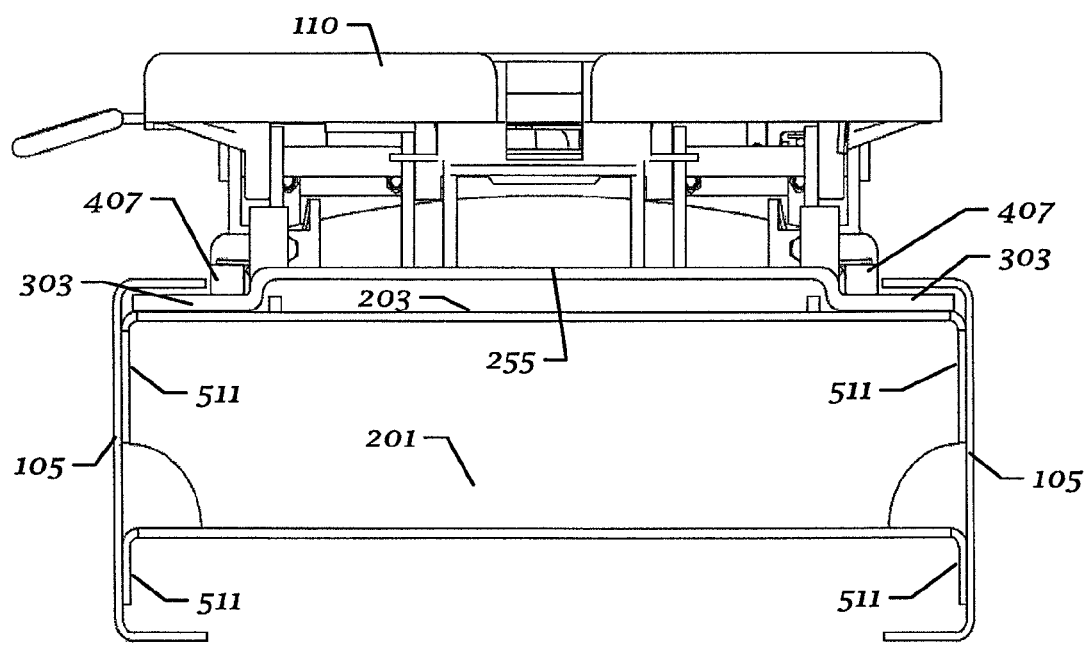
FIG. 5 is a section view of a sliding pedestal skid engaging a top surface of an inter-frame mount and the truck frame member.

FIG. 5 is an end-on plan view of the exemplary fifth wheel hitch described above. Fifth wheel hitch assembly 110 is coupled to sliding pedestal 255 seated upon the top surface 203 of the inter-frame mount 201. In this view, inter-frame mount 201 is configured with vertical flanges 511 that conform to the inner surfaces of the truck frame members 105. It may also be seen that the elements are arranged so that the skids 303 of the sliding pedestal 255 are interposed between the top surface 203 of the inter-frame mount 201 and the upper horizontal inward extensions of the frame members 105.

FIG. 6 is an illustration of the exemplary inter-frame mount shown in the previously referenced figures and described above. As described, the mount 201 includes the top surface 203 with laterally disposed arrays 204 of shaped apertures. In this version, the mount includes conformal vertical flanges 511: the upper flange 511a transitioning from a top plate 603 and extending downward; and a series of lower vertical flanges 511b-d, extending downward from a series of cross braces 601a-c. It will be understood that the figure depicts a perspective view from one side of the mount 201, however, the description applies to both sides of the mount 201. The cross braces 601a-c are connected to the top plate 603 by a corresponding series of transverse joists 605a-c. Vertical mounting flanges 511 include a plurality of holes that correspond to holes in the vertical sections of the frame members 105 so that to install the mount 201 in the frame members, fasteners are inserted into the holes. This version also includes large openings 604 defined in the top plate 603 which help to reduce weight. Inter-frame mount 201 may be constructed by forming top plate 603 from a sheet of material with a conventional stamping process. The cross braces 601a-c may also be formed from stamping. The braces 601, joists 605 and top plate 603 may then be welded together as shown.

FIGS. 7 through 9 illustrate different versions of an inter-frame mount which embody the inventive features described above. For example, in FIG. 7, an inter-frame mount 701 is depicted having a unitary, integral construction with a single top plate 703 having top surface 203 in which is defined two arrays 204 of shaped apertures 202. This version of the mount 701 is formed with upper downward extending, lateral conformal mounting flanges 711 on the sides, in which is defined a plurality of mounting holes for securing the mount 701 to the truck frame as described above. Mount 701 includes front and rear vertical inter-frame supports 705, 707 extending downward from the top plate 703, and front and rear inter-frame horizontal braces 709, 713 extending to the interior of the mount 701 from the respective lower portions of the vertical supports 705, 707. Openings 704 may be defined in the top plate 703, and the front and rear vertical supports 705, 707 to reduce weight. Mount 701 may be formed from a single sheet using a stamping process.

FIG. 8 depicts a version having one or more vertical, transverse joists 805 located toward the front of the mount, to which are fastened two laterally disposed top plates 803a, b, which provide lateral sliding surfaces 806 for sliding engagement of sliding pedestal 255 skids 303, and in which are defined the arrays 204 of shaped apertures 202. As in previous embodiments, top plates 803 include conformal vertical mounting flanges 811 extending downward from the lateral edges of the top plates 803 with mounting holes defined therein to secure the mount 801 to the inner channels of the truck frames. Also connected to the transverse joist 805 to its bottom are two laterally disposed mounting brackets 813a, b, each of which is formed with a conformal mounting flange 811b, c extending downward from the lateral edge of the bracket 813 in which is defined a plurality of mounting holes, as described above. Finally, this version includes a rear tie bar 815 connected in between the rearward portions of the top plates 803.

FIG. 9 illustrates a third variant of the mount 901 formed of two lateral, opposing c-shaped rail members 911 that would be dimensioned to be installed within the truck frame members and that are tied together with conformal front and rear c-shaped tie rails 905a, b. Rail members include lateral vertical walls 911a in which are defined mounting holes and horizontal portions 911b extending inward from the vertical walls. The horizontal portions 911b provide two lateral sliding surfaces for sliding engagement of the sliding pedestal 255 skids 303, and include the arrays 204 of shaped apertures 202 defined therein.

As described above and shown in the associated drawings, the present invention comprises an apparatus for fifth wheel coupling with inter-frame mount. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A fifth wheel hitch mountable between adjacent longitudinal truck frame members, said frame members having opposing open longitudinal channels, said hitch comprising:

an inter-frame mount seated within the opposing longitudinal channels, said mount having:
 a top surface within each lateral portion of which is defined a longitudinally-oriented row of spaced-apart, shaped apertures; and
 at least two substantially vertical flanges extending downward from the lateral periphery of said top surface, said vertical flanges dimensioned to be conforming to the inner surfaces of said longitudinal channels;
 and wherein said inter-frame mount is dimensioned such that there is a vertical gap between said top surface and the inner surfaces of the opposing truck frame members; and
a sliding pedestal comprised of:
 lateral skids seated upon respective portions of said rows and extending into each said vertical gap, each said skid including a plurality of spaced-apart, shaped skid apertures that can align with a corresponding plurality of shaped apertures comprising said rows;
 a pawl pivotally mounted on each skid having a one or more of teeth insertable through said skid apertures and said shaped apertures of said mount; and
 a plurality of pivot bearings mating to a corresponding plurality of bearings of a fifth wheel hitch plate.

2. The apparatus of claim 1, further comprising one or more transverse joist members support said top surface from underneath, and a plurality of lower vertical mounting flanges extending downward from the lateral peripheries of a plurality of cross braces, each of said cross braces being attached to the lower edges of each of said plurality of transverse joists, said lower vertical flanges dimensioned to be conforming to the inner surfaces of said longitudinal channels.

3. The apparatus of claim 1, wherein said inter-frame mount comprises a single component with front and rear vertical inter-frame supports extending downward from the front and rear peripheries of said top surface.

4. The apparatus of claim 1, wherein said top surface mount comprises a single component.

\* \* \* \* \*